United States Patent [19]

Choi

[11] Patent Number: 5,519,549
[45] Date of Patent: May 21, 1996

[54] VISS CIRCUIT FOR PREVENTING IMAGE SEARCH MALFUNCTION OCCURRING DUE TO VARIATION IN SPEED OF VIDEO TAPE

[75] Inventor: Nak Yeo Choi, Ansan, Rep. of Korea

[73] Assignee: Samsung Electronics Co., Ltd., Kyungki-do, Rep. of Korea

[21] Appl. No.: 172,076

[22] Filed: Dec. 23, 1993

[30] Foreign Application Priority Data

Jan. 14, 1993 [KR] Rep. of Korea .......................... 93-396

[51] Int. Cl.$^6$ ........................... G11B 15/18; G11B 17/00; G11B 19/02
[52] U.S. Cl. ............................... 360/71; 327/205
[58] Field of Search ........................ 360/70, 72.2, 73.07, 360/73.02, 43, 10.3, 32, 74.4, 80, 76, 31, 10.2, 72.1; 307/351, 290, 280, 279; 331/111; 327/205

[56] References Cited

U.S. PATENT DOCUMENTS

| | | | |
|---|---|---|---|
| 5,021,896 | 6/1991 | Horino | 360/70 |
| 5,103,350 | 4/1992 | Satake | 360/31 |
| 5,166,834 | 11/1992 | Mester et al. | 360/10.3 |
| 5,383,067 | 1/1995 | Choi | 360/72.2 |

Primary Examiner—Aristotelis Psitos
Assistant Examiner—Patrick Wamsley
Attorney, Agent, or Firm—Sughrue, Mion, Zinn, Macpeak & Seas

[57] ABSTRACT

A VISS circuit for preventing image search malfunction occurrence due to variation in the speed of a video tape used in a video cassette recorder makes it possible to carry out a normal VISS operation by utilizing the pulse width of the Schmitt trigger pulse, which is varied in accordance with the change in speed of the video tape. The circuit includes a Schmitt trigger circuit capable of varying the width of the Schmitt trigger pulse in accordance with variation of upper and lower extreme voltage values of a control signal based on the speed signals after detecting the tape speed signals at the time of the recording and the control signals from the control head, the varied width of the Schmitt trigger pulse being supplied to a VISS operation circuit, and a control device for supplying a signal for varying the width of the Schmitt trigger pulse produced by the Schmitt trigger circuit in accordance with the tape speed. The width of the Schmitt trigger pulse is adjusted in accordance with the magnitude of a control pulse which is proportionate to the tape speed, so that VISS malfunction caused by residual signals and noises can be prevented.

9 Claims, 2 Drawing Sheets

FIG. 1A
PRIOR ART
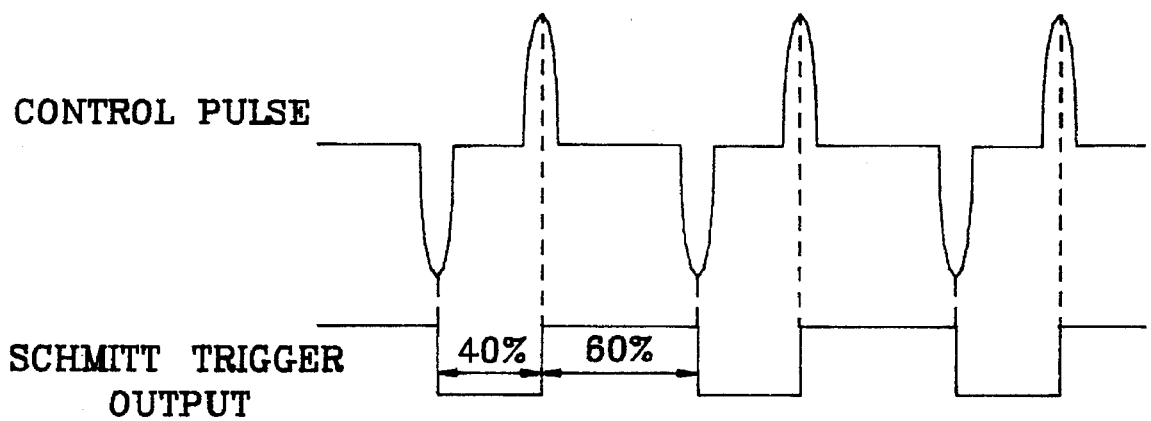
FIG. 1B
PRIOR ART
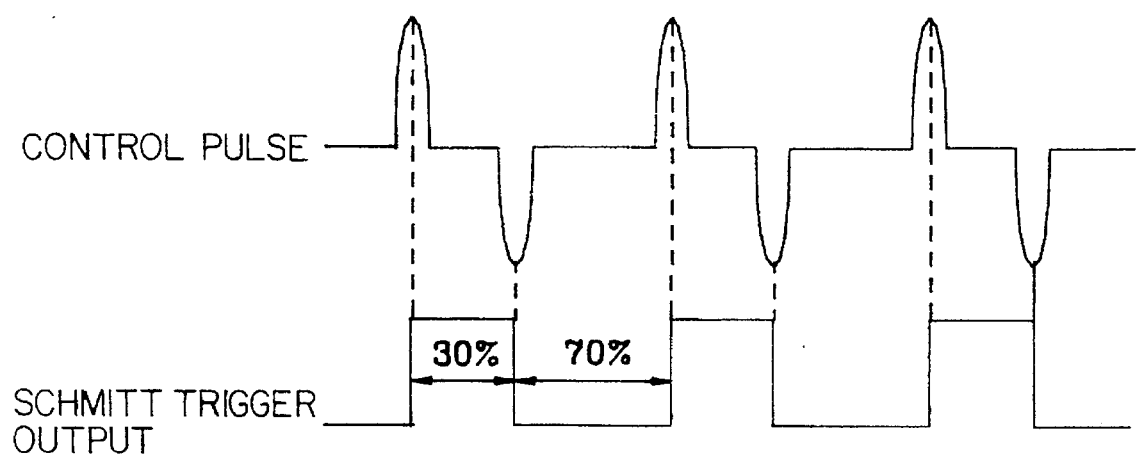
FIG. 1C
PRIOR ART 5,519,549

VISS CIRCUIT FOR PREVENTING IMAGE SEARCH MALFUNCTION OCCURRING DUE TO VARIATION IN SPEED OF VIDEO TAPE

BACKGROUND OF THE INVENTION

1. Field of the Invention

The present invention relates to a video cassette recorder having a video index search system function (hereinafter VISS) and, more particularly, the present invention relates to a circuit for preventing image search malfunction from occurring due to variation in the speed of the video tape in which the normal VISS operation is carried out using a variable pulse width supplied by a Schmitt trigger circuit in accordance with variation of the speed of the video tape.

Korean Patent Application No. 93-396 is incorporated herein by reference for all purposes.

2. Description of the Prior Art

The VISS function in a video cassette recorder (VCR) is provided for easily searching the contents of a tape for recorded data by recording index information. This index information is generally provided utilizing variations in the duty of a control pulse, which is used for controlling the phase of the VCR capstan motor.

However, VISS requires overwriting of the tape for recording the index information. If signals within the existing control track are not completely erased, or if a tape is a worn-out tape in use for a long time, residual signals or noises are included in the index information.

Therefore, when VISS operations such as intro scan and index search are carried out, the gains of the residual signals or noises are sufficiently high in accordance with the increase in the speed of the video tape, with the result that a malfunction occurs. In a worst case, phase control of the capstan motor becomes impossible even during a search mode. This phenomenon will be described in further detail below.

It will be noted that in carrying out the VISS function, the user arbitrarily records the index information on the control pulse, which is used as a comparison signal, by employing the variation of the duty cycle of the control pulse in order to control the phase of the capstan motor.

Later, when the VISS operation is carried out, e.g., when searching for the recorded portion, the index information is picked up by detecting the duty cycle variation.

During the search mode, the reproduction operation is carried out starting from the relevant portion, while, during the intro scan mode, reproduction is carried out for 5 seconds and then fast forward winding (FF) or rewinding (REW) of the tape is carried out until the next index information is located.

As shown in FIG. 1A, during a normal mode of operation, a ratio of the duty of the control phase is maintained at about 60%, and reproduction is made at 30 Hz, so that the control signal can be used as a comparison signal for controlling the phase of the capstan motor.

When performing a VISS overwriting operation, as shown in FIG. 1B, the index information is recorded by utilizing the negative side of the control signal, so that a ratio of the duty of the control pulses should be about 30%. During the VISS index search/intro scan operations, the duty cycle variation of the relevant portion is detected to carry out the next operation.

When carrying out the VISS overwriting operation, the negative side of the control pulses which are recorded on the control track may not be erased sufficiently, with the result that residual signals R remain thereon. Particularly in the case of a worn-out video tape, such residual signals remain even on the positive side of the control pulse as noise N, thereby aggravating the problem.

The VHS specification requires that the ratio of the level of the main signals to the level of the residual signal should be above about 20 dB, but this is the condition for recording. When the fast forward or rewinding operations are carried out in a reproduction mode, the pulse width of the level of the noise N and the level of the residual signal R exceed the width of the Schmitt trigger pulse. This phenomenon is more significant at the beginning and the end of the tape.

When the VISS operation is carried out by fast forward winding or rewinding operations, the level of the noise N or the level of the residual signal R exceeds the pulse width of the Schmitt trigger circuit in the same way as in normal reproduction, with the result that a VISS malfunction occurs. That is, the residual signals come to exceed the pulse width of the Schmitt trigger circuit and, consequently, an output of the Schmitt trigger circuit having a duty which does not fit the VISS format is formed, thereby causing the VISS malfunction. See FIG. 1C.

U.S. Pat. No. 5,021,896, entitled FAST SEARCH DEVICE IN MAGNETIC RECORDING AND REPRODUCTION DEVICE, discloses a technique for controlling the relative speed between the rotary drum and the tape at a predetermined speed even during a search start condition, which condition occurs only momentarily, so that the information on the tape can be read even during a high speed search.

According to U.S. Pat. No. 5,021,896, when a high speed search command is received, the rotary drum is driven in such a manner that the relative speed becomes a predetermined speed without an increase in the tape speed. Furthermore, after the relative speed equals the predetermined speed, the speed of the rotary drum gradually varies so as to be suitable for a high speed search. On the other hand, the rotary speed of the tape reel is varied while maintaining the tape speed relative to the predetermined speed, until the speed of the tape reel reaches the desired value. Thus, owing to such arrangement, when the search starting (momentary) condition is initiated, the relative speed between the rotary drum and the tape is controlled at a predetermined speed, thereby making it possible to read the information on the tape.

While using the above described technique, to prevent such malfunction as searching the position of another music for a designated music or skipping the designated position is possible, it is impossible to prevent the malfunction due to the noise or residual signals.

SUMMARY OF THE INVENTION

The present invention is intended to overcome the above described disadvantages of the conventional techniques.

Therefore, one object of the object of the present invention to provide a circuit for preventing picture search malfunction from occurring due to the variation of the speed of video tape.

Another object according to the present invention to provide a circuit for preventing picture search malfunction from occurring by controlling the pulse width of the Schmitt trigger pulse. According to one aspect of the present invention, the Schmitt trigger pulse is adjusted in accordance with the magnitude of the control pulse, which itself is proportionate to the running speed of the tape, so that the malfunction of the VISS operation due to the noise or residual signals other than control signals can be prevented.

Another object of the present invention is to provide a circuit for preventing noise and residual signals by changing the trigger level, e.g., low or high, of a Schmitt trigger during a regeneration operation according to the recording speed, i.e., SP, LP or SLP. According to one aspect of the invention, the circuit is insensitive to changes in level as the recording speed varies, since the width of the Schmitt trigger circuit pulse indicates a trigger level.

These an other features, objects and advantages of the present invention are provided by a circuit for use in a video cassette recorder, having an audio/control head for reading the control signals loaded on the video tape, and an amplifier for amplifying the control signals, the circuit including a Schmitt trigger circuit capable of varying the width of the Schmitt trigger in accordance with the variation of the upper and lower limit values of the control signals based on the speed signals after detecting amplified control signals and the tape speed signals at the time of the recording and a control device for supplying a signal for varying the width of Schmitt trigger pulse to the Schmitt trigger circuit in accordance with the tape speed.

BRIEF DESCRIPTION OF THE DRAWINGS

The above object and other advantages of the present invention will become more apparent by describing in detail the preferred embodiment of the present invention with reference to the attached drawings, in which:

FIGS. 1A–1C each illustrate the waveforms of the control pulse and a Schmitt trigger pulse, obtainable from Schmitt trigger circuit, during a normal operation, a VISS operation and a VISS malfunction, respectively;

DETAILED DESCRIPTION OF THE INVENTION

Figure 2:
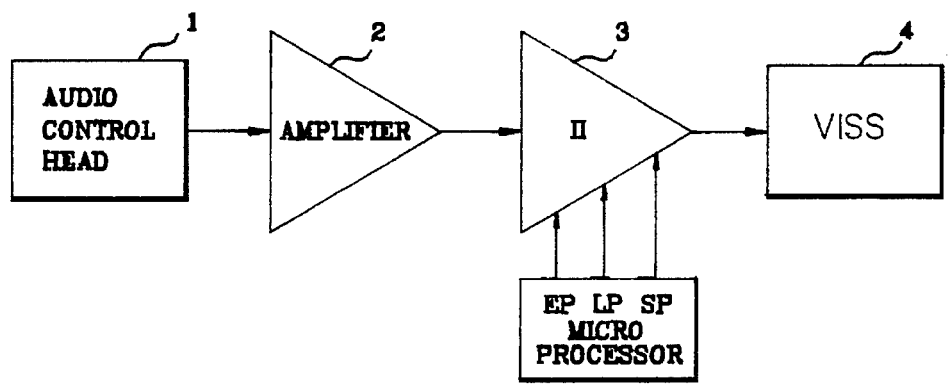
FIG. 2 is a high level block diagram showing the constitution of the circuit for preventing VISS malfunction by utilizing the video tape speed variation according to the present invention.

FIG. 2 is a block diagram showing the constitution of the circuit for preventing image search malfunction by utilizing speed variation of the video tape according to the present invention.

In FIG. 2, since the control signal which is read from a video tape by an audio control head 1 is too weak, it is amplified to a sufficient level by a pre-amplifier 2. The amplified control pulse is then converted into a square wave in Schmitt trigger circuit 3. Here, the square wave includes index information conveyed by duty cycle. The square wave signal which is generated by the Schmitt trigger circuit 3 is applied to a VISS operating circuit 4 for providing a VISS function.

Meanwhile, a microprocessor 5 supplies various speed signals, e.g., SP (standard play), LP (long play), SLP (super long play) according to the fast forward or rewinding operation, to the Schmitt trigger circuit 3. The Schmitt trigger circuit 3 adjusts the width of the Schmitt trigger utilizing the received speed signals.

The tape speed of VHS VTR (in the form of a standard) operating in SP mode is 33.34 mm/s in the NTSC system and 23.39 mm/s in the PAL and SECAM systems. Furthermore, the tape speed equivalent to ½ of SP is called LP, while the tape speed equivalent to ⅓ of SP is called SLP.

In short, the tape speed during a VISS operation for the purpose of finding the index portion is decided by double speed operation of the motor and the wound volume of the tape, as in the case of the fast forward and rewinding (FF/REW) operation. During the time that the video tape is subjected to the fast forward winding or rewinding operation for carrying out a VISS operation by utilizing the information of the fast forward winding and rewinding operations, the width of the Schmitt trigger pulse is varied to be larger in magnitude than the noise or residual signals but smaller than the control signal, so that only the control signal can operate the VISS operating circuit 4.

Figure 3:
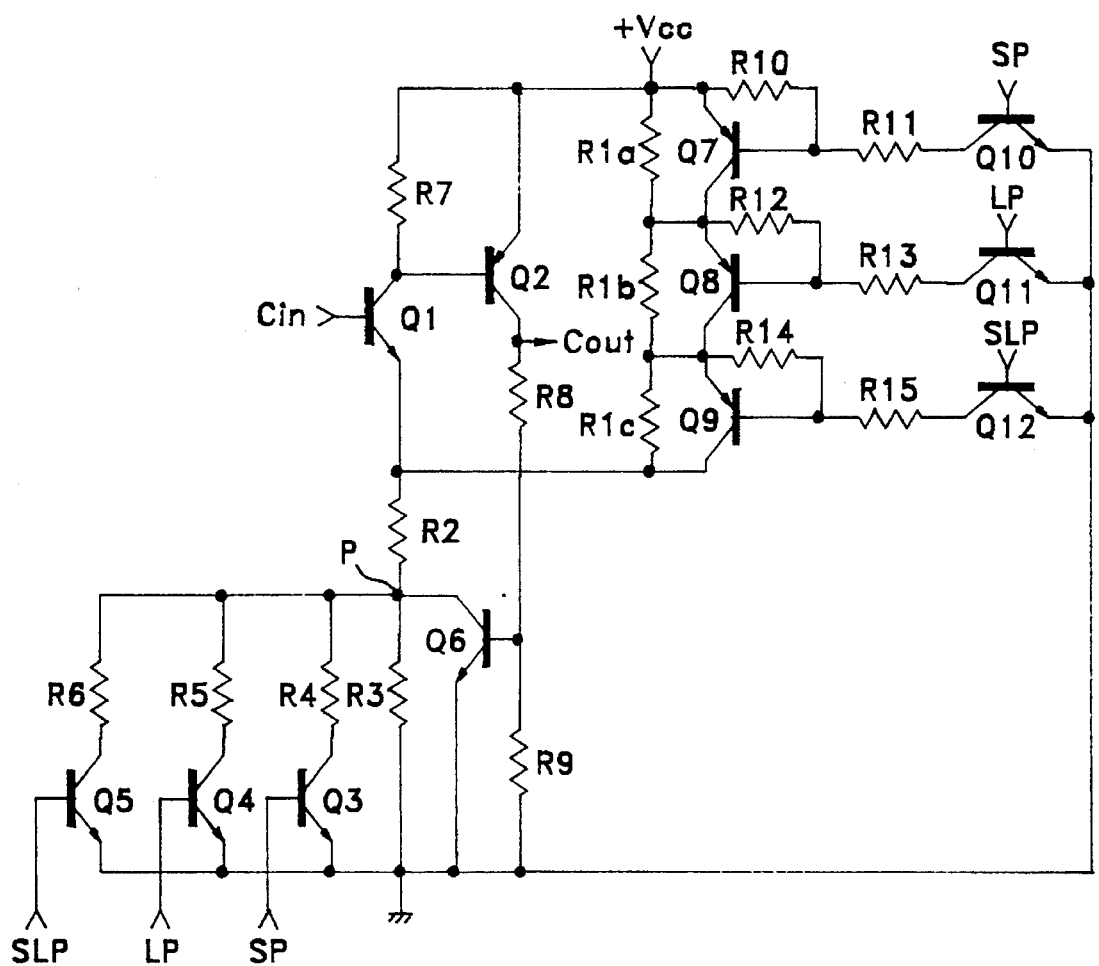
FIG. 3 is a detail circuit diagram of the Schmitt trigger circuit of FIG. 2.

FIG. 3 is a detailed circuit diagram of the Schmitt trigger circuit 3 illustrated in FIG. 2. The Schmitt trigger circuit 3 receives the tape speed control signals SP, LP and SLP from the microprocessor 5 to vary the pulse width of the Schmitt trigger in accordance with the speed of the respective recorded tape, thereby preventing erroneous VISS operations caused by the noise or residual signals.

A control signal $C_{in}$ is supplied from the pre-amplifier 2 of FIG. 2 to the base of a transistor Q1, and a supply voltage source $V_{cc}$ is supplied through a resistor $R_7$ to the collector of the transistor Q1, while the base of a PNP type transistor Q2 is connected to the collector of the transistor Q1.

Further, the voltage source $V_{cc}$ is supplied through serially connected resistors $R_{1a}$, $R_{1b}$ and $R_{1c}$ to the emitter of the transistor Q1, which is grounded through resistors $R_2$ and $R_3$. Furthermore, the emitter of the transistor Q1 is connected through resistors $R_4$, $R_5$ and $R_6$ to the collectors of transistors Q3, Q4 and Q5, respectively.

Preferably, speed control signals SP, LP and SLP are supplied from the microprocessor 5 to the bases of the transistors Q3, Q4 and Q5, each of which has a grounded emitter. The collector of a transistor Q6 advantageously is connected to a node P between resistors $R_2$ and $R_3$. The emitter of Q6 is also grounded.

The voltage source $V_{cc}$ preferably is supplied to the emitter of the transistor Q2, and its collector supplies a control signal $C_{out}$ to VISS operating circuit 4, whereby the control signal $C_{in}$ is converted into square wave $C_{out}$.

The collector of the transistor Q2 is connected through a resistor $R_8$ to the base of the transistor Q6.

Furthermore, the emitters and collectors of transistors Q7, Q8 and Q9 are connected across the resistors $R_{1a}$, $R_{1b}$ and $R_{1c}$, respectively, while the bases of the transistors Q7, Q8 and Q9 are connected to the corresponding collectors of transistors Q10, Q11 and Q12, the bases of which receive speed control signals SP, LP and SLP from the microprocessor 5 via resistors $R_{11}$, $R_{12}$ and $R_{14}$, respectively.

Here, the resistance values of the resistors $R_{1a}$, $R_{1b}$ and $R_{1c}$ are arranged in magnitude order, e.g., $R_{1a} > R_{1b} > R_{1c}$. The resistance values of the resistors $R_4$, $R_5$ and $R_6$ satisfy the relationship $R_4 < R_5 < R_6$.

When all speed control signals SP, LP and SLP formed in the microcomputer 5 are low signals and when these signals are applied to transistor Q3–Q5 and Q7–Q12, respectively, they are all turned off.

In this case, the upper and lower extreme levels $V_H$ and $V_L$ at which the Schmitt trigger circuit 3 operates are as follows.

When the transistors Q3–Q5 and Q7–Q12 are all turned off (during FF, REW or VISS operations), the transistor Q1 at the input side of the Schmitt trigger circuit 3 is turned off and the transistor Q2 at its output side is also turned off.

If a control signal $C_{in}$ which is less than the upper extreme level $V_H$ is input into the transistor Q1, the transistor Q1 remains off, and accordingly, the transistor Q2 also remains off. The voltage source $V_{cc}$ is divided by the resistors $R_{1a}$, $R_{1b}$, $R_{1c}$, $R_2$ and $R_3$ to form the emitter voltage $V_E$ of the transistor Q1, where the voltage $V_E$ is expressed as follows.

$$V_E = \frac{R_2 + R_3}{R_1 + R_2 + R_3} \times V_{CC} \tag{1}$$

and where $R_1 = R_{1a} + R_{1b} + R_{1c}$.

However, in order to make the transistor Q1 turn on, the base voltage of the transistor Q1 has to be larger than the emitter voltage $V_E$ by the amount of the operation voltage $V_{BE}$ across the base-emitter of the transistor Q1. Therefore, the voltage value of the upper extreme value $V_H$, which is the minimum voltage required for making the transistor Q1 turn on given by the expression:

$$V_H = V_E + V_{BE} = \frac{R_2 + R_3}{R_1 + R_2 + R_3} \times V_{CC} + 0.7V \tag{2}$$

Again, $R_1 = R_{1a} + R_{1b} + R_{1c}$.

The lower extreme level $V_L$ can be obtained as follows. When the transistor Q1, which has already been turned on, is to be turned off, its base voltage has to be dropped down below the voltage level needed to keep transistor Q1 turned on. As shown in FIG. 3, when the transistor Q1 is turned on, the PNP type transistor Q2 is also turned on, thereby making the transistor Q6 turn on. The voltage $V_{cc}$ does not pass through the resistor $R_3$ in that case, but passes directly through the collector-emitter of the transistor Q6. Consequently, a supply voltage source $V_{cc}$ is divided by the resistors $R_{1a}$, $R_{1b}$ and $R_{1c}$ and $R_2$ so as to form the emitter voltage $V_E$. Therefore, the emitter voltage $V_E$ can be expressed as follows:

$$V_E = \frac{R_2}{R_1 + R_2} \times V_{CC} \tag{3}$$

where $R_1 = R_{1a} + R_{1b} + R_{1c}$.

It will be noted that the base voltage of transistor Q1 becomes higher in response to the threshold voltage $V_{BE}$ across the base-emitter junction of transistor Q1, and therefore, the lower extreme level $V_L$ can be defined as follows:

$$V_L = V_E + V_{BE} = \frac{R_2}{R_1 + R_2} \times V_{CC} + 0.7V \tag{4}$$

Accordingly, if voltage which is lower than the lower extreme level $V_L$ is supplied to the base of the transistor Q1, the transistors Q1 and Q2 are advantageously turned off.

Thus, as a control signal $C_{in}$ is slowly varied, the transistors Q1 and Q2 are repeatedly turned on and off at the values of the upper and lower extreme levels, $V_H$ and $V_L$.

During the SP mode of operation, the speed control signals SP, LP and SLP, i.e., the output data of the microprocessor 5, are "1", "0" and "0", respectively. In this case, the upper and lower extreme levels VH and V, are determined using equations (2) and (4). However, the resistance values are changed due to operation of the transistors Q3, Q10 and Q7, as discussed in detail below.

The resistors $R_3$ and $R_4$ are connected in parallel due to operation of transistor Q3, and the transistors Q10 and Q7 are turned on. A path through the emitter-collector of the transistor Q7 and the resistors $R_{1b}$ and $R_{1c}$ advantageously is formed, e.g., $R_{1a}$ is shorted.

Therefore, the upper and lower extreme levels are defined as follows:

$$V_H = \frac{R_2 + R_A}{R_X + R_2 + R_A} \times V_{CC} + 0.7 \tag{5}$$

$$V_L = \frac{R_2}{R_X + R_2} \times V_{CC} + 0.7V \tag{6}$$

In equations (5) and (6), $R_A$ represents a parallel resistance value of the resistors $R_3$ and $R_4$, e.g., $R_3 / R_4$, and $R_X$ represents $R_{1b} + R_{1c}$.

During the LP mode, the speed control signals SP, LP and SLP which are the output data of the microprocessor, are "0", "1" and "0", respectively. It will be appreciated that the transistors Q4, Q8 and Q11 are turned on, and therefore, $V_H$ and $V_L$ become as follows:

$$V_H = \frac{R_2 + R_B}{R_Y + R_2 + R_B} \times V_{CC} + 0.7V \tag{7}$$

$$V_L = \frac{R_2}{R_Y + R_2} \times V_{CC} + 0.7V \tag{8}$$

In the above expression, $R_B$ represents a parallel resistance value of the resistors $R_3$ and $R_5$ ($R_B = R_3 / R_5$), and $R_Y$ represents $R_{1a} + R_{1c}$.

During the SLP mode, the speed control signals SP, LP, and SLP which are the output data of the microprocessor 5, are "0", "0" and "1", respectively. Advantageously, the transistors Q5, Q9 and Q12 are turned on, and the values of $V_H$ and $V_L$ become as follows:

$$V_H = \frac{R_2 + R_C}{R_Z + R_2 + R_C} \times V_{CC} + 0.7V \tag{9}$$

$$V_L = \frac{R_2}{R_Z + R_2} \times V_{CC} + 0.7V \tag{10}$$

In equations (9) and (10) above, $R_C$ represents a parallel resistance value of the resistors $R_3$ and $R_6$ ($R_C = R_3 / R_6$) and $R_Z$ represents $R_{1a} + R_{1b}$.

As described above, the Schmitt trigger circuit 3 receives the speed signals SP, LP and SLP which are supplied by the microprocessor 5 to indicate the speed at the time of the recording. In accordance with the increasing or decreasing of the speed, the width of the Schmitt trigger pulse is varied and adjusted.

That is, as shown in equations (5) and (10) above, the values of the upper and lower extreme levels $V_H$ and $V_L$ in response to the speed control signal LP are larger than the values of the upper and lower extreme levels $V_H$ and $V_L$ associated with the signal SP. Furthermore, the values of the upper and lower extreme levels $V_H$ and $V_L$ in response to the speed control signal SLP are larger than the values of the upper and lower extreme levels $V_H$ and $V_L$ associated with the speed control signal LP.

Accordingly, during the operation of the Schmitt trigger circuit 3 including the transistor Q1 at an input side, the width of the required voltage is increased, and the widths of the noise N and the residual signals R are somewhat increased in accordance with the increase in the running speed of the tape. However, even under such a circumstance, the pulse width of the Schmitt trigger circuit 3 is not affected.

According to the present invention as described above, the width of the Schmitt trigger pulse is adjusted in accordance with the magnitude of the control pulses which are proportionate to the speed of the tape, so that VISS malfunction caused by the residual signals or noises can be prevented.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A circuit for preventing image search malfunction occurrence due to variation in speed of a video tape, for use in a video cassette recorder having an audio and control head for reading out a control signal loaded on the video tape, and an amplifier for amplifying said control signal, comprising:

Schmitt trigger circuit means for varying a pulse width produced by the Schmitt trigger circuit means in accordance with variation of an upper extreme voltage value and a lower extreme voltage value responsive to said control signal by detecting said amplified control signal and tape speed control signals at the time of the recording, said control signal being proportionate to said tape speed signals; and control means for applying said speed control signals to said Schmitt trigger circuit means for varying the pulse width of the Schmitt trigger circuit means in accordance with the tape speed.

2. The circuit for preventing image search malfunction as claimed in claim 1, wherein said Schmitt trigger circuit means comprises a plurality of resistors, a first transistor having a base receiving said control signal from said amplifier, a collector receiving a supply voltage through a seventh resistor ($R_7$), and an emitter being supplied with said voltage through first serially connected resistors ($R_{1a}$, $R_{1b}$, and $R_{1c}$), wherein said emitter of said first transistor is grounded through second and third resistors ($R_2$ and $R_3$), wherein one of said first serially connected resistors ($R_{1a}$, $R_{1b}$ and $R_{1c}$) is shorted responsive to first, second and third speed control signals from control means, and wherein resistor ($R_3$) is selectively connected in parallel with fourth through sixth resistors ($R_4$, $R_5$ and $R_6$) responsive to said first, said second and said third speed control signals from said control means, and wherein said Schmitt trigger circuit means determines said upper and said lower extreme voltage values $V_H$ and $V_L$ based on the following formulas, when the tape speed signal supplied by said control means is said first speed control signal:

wherein $R_A = R_3/R_4$, wherein $R_x = R_{1b} + R1c$, and wherein $R_{1b} > R_{1c}$.

3. The circuit for preventing image search malfunction as claimed in claim 1, wherein said Schmitt trigger circuit means comprises a plurality of resistors, a first transistor having a base receiving said control signal from said amplifier, a collector receiving a supply voltage through a seventh resistor ($R_7$), and an emitter being supplied with said voltage through first serially connected resistors ($R_{1a}$, $R_{1b}$ and $R_{1c}$), wherein said emitter of said first transistor is grounded through second and third resistors ($R_2$ and $R_3$), wherein one of said first serially connected resistors ($R_{1a}$, $R_{1b}$ and $R_{1c}$) is shorted responsive to first, second and third speed control signals from control means, and wherein resistor ($R_3$) is selectively connected in .parallel with fourth through sixth resistors ($R_4$, $R_5$ and $R_6$) responsive to said first, said second and said third speed control signals from said control means, and wherein said Schmitt trigger circuit means determines the upper and lower extreme voltage values $V_H$ and $V_L$ of said control signal based on the following formulas, when the tape speed signal supplied by said control means is said second speed control signal:

wherein $R_B = R_3/R_5$, wherein $R_Y = R_{1a} + R_{1c}$, and wherein $R_{1a} > R_{1c}$.

4. The circuit for preventing image search malfunction as claimed in claim 1, wherein said Schmitt trigger circuit means comprises a plurality of resistors, a first transistor having a base receiving said control signal from said amplifier, a collector receiving a supply voltage through a seventh resistor ($R_7$), and an emitter being supplied with said voltage through first serially connected resistors ($R_{1a}$, $R_{1b}$ and $R_{1c}$), wherein said emitter of said first transistor is grounded through second and third resistors ($R_2$ and $R_3$), wherein one of said first serially connected resistor ($R_{1a}$, $R_{1b}$ and $R_{1c}$) is shorted responsive to first, second and third speed control signals from control means, and wherein resistor ($R_3$) is selectively connected in parallel with fourth through sixth resistors ($R_4$, $R_5$ and $R_6$) responsive to said first, said second and said third speed control signals from said control means, and wherein said Schmitt trigger circuit means determines the upper and lower extreme voltage values $V_H$ and $V_L$ based on the following formulas, when the tape speed signal supplied by said control means is said third speed control signal:

wherein $R_C = R_3/R_6$, wherein $R_Z = R_{1a} + R_{1b}$, and wherein $R_{1a} > R_{1b}$.

5. A circuit for preventing image search malfunction occurrence due to variation in speed of a video tape, for use in a video cassette recorder having an audio and control head for reading out a control signal loaded on the video tape, and an amplifier for amplifying said control signal, comprising:

a Schmitt trigger circuit capable of varying a width of a Schmitt trigger pulse in accordance with variation of respective upper and lower extreme voltage values responsive to said control signal by detecting said amplified control signal and tape speed signals at the time of recording, said control signal being proportionate to said tape speed signals, wherein said Schmitt trigger circuit includes a plurality of resistors and comprises:

a first transistor having a base for receiving said control signal from said amplifier, a collector for receiving a supply voltage through a seventh resistor, and an emitter being supplied with said voltage through first serially connected resistors, wherein said emitter of said first transistor is grounded through second and third resistors;

a second transistor having a base connected to the collector of said first transistor, an emitter supplied with said voltage, and a collector for generating a square wave after adjusting the width of the Schmitt trigger pulse;

third to fifth transistors having respective bases for receiving first, second and third speed control signals from control means, respective emitters connected to ground, and respective collectors for being respectively connected through fourth to sixth resistors between said second and said third resistors;

a sixth transistor having a base connected to the collector of said second transistor via an eighth resistor, an emitter connected to ground, and a collector connected to a node between said second and said third resistors;

seventh through ninth transistors having respective emitters and collectors respectively connected across said first resistors; and tenth to twelfth transistors having respective bases for receiving said first, second and third speed control signals from said control means, respective collectors respectively connected to said bases of said seventh to ninth transistors, and respective bases connected to ground; and said control means for supplying said first, second and third speed control signals for varying the width of the Schmitt trigger circuit pulse in accordance with the tape speed.

6. The circuit for preventing image search malfunction as claimed in claim 5, wherein said Schmitt trigger circuit determines the upper and lower extreme voltage values $V_H$ and $V_L$ based on the following formulas, when the tape speed signal supplied by said control means is said first speed control signal:

$$V_H = \frac{R_2 + R_A}{R_X + R_2 + R_A} \times V_{CC} + 0.7$$

$$V_L = \frac{R_2}{R_X + R_2} \times V_{CC} + 0.7V$$

wherein $R_A = R_3/R_4$,
wherein $R_x = R_{1b} + R_{1c}$, and
wherein $R_{1b} > R_{1c}$.

7. The circuit for preventing image search malfunction as claimed in claim 5, wherein said Schmitt trigger circuit determines the upper and lower extreme voltage values $V_H$ and $V_L$ of said control signals based on the following formulas, when the tape speed signal supplied by said control means is said second speed control signal:

$$V_H = \frac{R_2 + R_B}{R_Y + R_2 + R_8} \times V_{CC} + 0.7V$$

$$V_L = \frac{R_2}{R_Y + R_2} \times V_{CC} + 0.7V$$

wherein $R_B = R_3 / R_5$,
wherein $R_Y = R_{1a} + R_{1c}$, and
wherein $R_{1a} > R_{1c}$.

8. The circuit for preventing image search malfunction as claimed in claim 5, wherein said Schmitt trigger circuit decides the upper and lower extreme voltage values $V_H$ and $V_L$ based on the following formulas, if the tape speed signal supplied by said control means:

$$V_H = \frac{R_2 + R_C}{R_Z + R_2 + R_C} \times V_{CC} + 0.7V$$

$$V_L = \frac{R_2}{R_Z + R_2} \times V_{CC} + 0.7V$$

wherein $R_C = R_3/R_6$,
wherein $R_Z = R_{1a} + R_{1b}$, and
wherein $R_{1a} > R_{1b}$.

9. The circuit for preventing image search malfunction as claimed in claim 5, wherein the resistance values of said fourth to sixth resistors satisfy the condition that $R_4 < R_5 < R_6$ in magnitude order.

* * * * *